United States Patent
Matsui et al.

(10) Patent No.: US 7,133,175 B2
(45) Date of Patent: Nov. 7, 2006

(54) LIGHT BEAM DEFLECTING DEVICE

(75) Inventors: Susumu Matsui, Hachioji (JP); Naohiro Ono, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/870,203

(22) Filed: Jun. 17, 2004

(65) Prior Publication Data

US 2004/0233492 A1    Nov. 25, 2004

(30) Foreign Application Priority Data

Oct. 3, 2003    (JP)    ............................. 2003-345383

(51) Int. Cl.
    *G02B 26/08*    (2006.01)
(52) U.S. Cl. .................... 359/200; 359/198
(58) Field of Classification Search ............... 359/216, 359/198, 200, 850, 855
    See application file for complete search history.

(56) References Cited

U.S. PATENT DOCUMENTS 6,198,561 B1 *    3/2001    Kobayashi et al. ......... 359/198
6,574,023 B1 *    6/2003    Matsui et al. ............... 359/199

* cited by examiner

*Primary Examiner*—Euncha P. Cherry
(74) *Attorney, Agent, or Firm*—Cohen, Pontani, Lieberman & Pavane

(57)    ABSTRACT

A light beam deflecting device having therein a rotor portion fixed on an outer circumference of a bearing, a polygon mirror stuck and fixed on a supporting section of the rotor portion and an elastic material for pressing and holding the polygon mirror on the supporting section, wherein the rotor portion has a cylindrical portion fixed on the outer circumference of the bearing, the supporting section and a disc-shaped flange portion provided on an end portion of the cylindrical portion, and a clearance is provided between an inner circumference of the cylinder portion on the end portion side where the flange portion is provided and an outer circumference of the bearing.

17 Claims, 4 Drawing Sheets

LIGHT BEAM DEFLECTING DEVICE

BACKGROUND OF THE INVENTION

The present invention relates to a light beam deflecting device equipped with a polygon mirror (rotating polygon mirror) used for an image forming apparatus such as, for example, a laser beam printer and a laser facsimile machine.

Heretofore, in an image recording apparatus such as a laser printer, a laser beam is made to enter a polygon mirror (rotating polygon mirror) that rotates at high speed on a light beam deflecting device based on information read as a means of writing images, and thus, a reflected light beam is made to scan to be projected on the surface of a photoreceptor, for image recording. FIG. 7 is a perspective view showing an embodiment of a beam-scanning optical device employing a light beam deflecting device using a polygon mirror.

In the drawing, the numeral 80 represents a semiconductor laser, 81 represents a collimator lens of a beam-forming optical system, 82 represents a first cylindrical lens, 83 represents a polygon mirror, each of 84A and 84B is an fθ lens, 85 represents a second cylindrical lens, 86 represents a mirror, 87 represents a cover glass and 88 represents a photoreceptor drum. Incidentally, 89 represents an index mirror for synchronous detection, 89S represents an index sensor for synchronous detection and 83M represents a driving portion to rotate polygon mirror 83 on the light beam deflecting device.

A light beam emitted from the semiconductor laser 80 is made to be collimated light by the collimator lens 81, and passes through the first cylindrical lens 82 of a first image forming optical system to enter a mirror surface of the polygon mirror 83 that is rotating at constant high speed. Then, the reflected light therefrom passes through a second image forming optical system composed of fθ lenses 84A, 84B and the second cylindrical lens 85 to conduct (main) scanning on the circumferential surface of the photoreceptor drum 88 with a spot having a prescribed diameter, through the mirror 86 and the cover glass 87. The main scanning direction is subjected to fine adjustment by an unillustrated adjusting mechanism, and synchronous detection for each one line is made when a beam before the start of scanning enters index sensor 89S through index mirror 89.

To obtain an excellent latent-image on photoreceptor drum 88 with the beam-scanning optical device like that mentioned above, it is requested that a reflecting surface of the polygon mirror that rotates at high speed is processed to be a highly accurate plane, and it rotates without eccentricity and inclination from a rotation axis and without positional deviation in the axial direction.

A rotary mirror unit is provided with a polygon mirror and a permanent magnet for generating torque that faces a coil mounted on a printed board on the fixed base board, and it is structured to rotate at high speed on a bearing.

When the mirror unit rotates especially at high speed such as 30,000 rpm or higher, an air dynamic pressure bearing is used, and there is known a light beam deflecting device wherein a ceramic material is used for a member on one side of a dynamic pressure bearing member and a metallic material is used for a member on the other side, to raise durability and abrasion resistance and thereby to lengthen life, between an inner cylindrical bearing and an outer cylindrical bearing both forming the air dynamic pressure bearing (JP TOKKAI No. 2001-173643).

There is further known a light beam deflecting device wherein a surface roughness of a contact surface on one side or both sides where a polygon mirror and a flange are in contact each other satisfies 3 μm≦Ry≦20 μm, under the structure where the polygon mirror is pressed against the flange to be held by a pressing member (JP TOKKAI No. 2002-48997).

However, in the light beam deflecting device which has been used so far, if the polygon mirror is shifted by a centrifugal force or by thermal expansion while it is used, a balance of a rotor portion is changed to cause vibrations and noises. If an amount of shifting grows greater, binding is caused on the dynamic pressure bearing, resulting in its rupture. Further, if spring force (force of an elastic member) which presses the polygon mirror is made to be stronger, the polygon mirror becomes hard to be shifted, but a flatness of the polygon mirror is worsened, and scanning characteristics, namely, image qualities are deteriorated, which is a problem. If contact surfaces between the polygon mirror and the flange portion are roughened, the polygon mirror turns out to be hardly shifted, but it becomes insufficient in use at high speed rotation of 50,000 rpm or higher or at high temperature of 60° C. or higher. Therefore, when the polygon mirror is made to adhere for prevention of its shifting, if hard adhesives of an epoxy type are used, there is caused a problem that the polygon mirror is distorted by internal stress of adhesives and by thermal strain in the course of adhesion hardening or in the course of usage, although it is effective for preventing shifting of the polygon mirror. When flexible adhesives of a silicon type are used, it is impossible to control shifting of the polygon mirror sufficiently, although distortion of the polygon mirror can be prevented by deformation of adhesive itself.

SUMMARY OF THE INVENTION

An object of the invention is to solve the aforementioned problems and thereby to provide a light beam deflecting device equipped with a polygon mirror (rotating polygon mirror) wherein mirror shifting balance changes caused by thermal-expansion resulting from shocks, centrifugal force and heat generation in high speed rotation are prevented, and mirror flatness is improved.

The object of the invention stated above can be attained by either one of the following Structures (1)–(3).

Structure (1): A light beam deflecting device having therein a rotor portion fixed on an outer circumference of a bearing, a polygon mirror stuck and fixed on a supporting section of the rotor portion and an elastic material for pressing and holding the polygon mirror on the supporting section, wherein the rotor portion has a cylindrical portion fixed on the outer circumference of the bearing, the supporting section and a disc-shaped flange portion provided on an end portion of the cylindrical portion, and a clearance is provided between an inner circumference of the cylinder portion on the end portion side where the flange portion is provided and an outer circumference of the bearing.

Structure (2): A light beam deflecting device having therein a rotor portion fixed on an outer circumference of a bearing, a polygon mirror stuck and fixed on a supporting section of the rotor portion and an elastic material for pressing and holding the polygon mirror on the supporting section, wherein the rotor portion has a first cylindrical portion fixed on the outer circumference of the bearing, a second cylindrical portion on which the supporting section is provided and a flange portion that connects the first cylindrical portion to the second cylindrical portion.

Structure (3): A light beam deflecting device having therein a rotor portion fixed on an outer circumference of a bearing, a polygon mirror stuck and fixed on a supporting section of the rotor portion and an elastic material for pressing and holding the polygon mirror on the supporting section, wherein the rotor portion has a first cylindrical portion fixed on the outer circumference of the bearing, a second cylindrical portion on which the supporting section is provided and a flange portion that connects an end portion of the first cylindrical portion to the second cylindrical portion, and a clearance is provided between an inner circumference of the first cylinder portion on the end portion side where the flange portion is provided and an outer circumference of the bearing.

The invention is to provide a light beam deflecting device equipped with a polygon mirror (rotating polygon mirror) wherein mirror shifting balance changes caused by thermal expansion resulting from shocks, centrifugal force and heat generation in high speed rotation are prevented, and mirror flatness is improved, by taking the aforesaid structures.

The invention makes it possible to provide a light beam deflecting device equipped with a polygon mirror (rotating polygon mirror) wherein mirror shifting balance changes caused by thermal expansion resulting from shocks, centrifugal force and heat generation in high speed rotation are prevented, and mirror flatness is improved. Further, owing to the fixed polygon mirror serving as both adhesion and pressing by spring, a decline of performance and rupture caused by shifting and falling off of the polygon mirror can be prevented, and by providing, on the rotor portion, a portion which has low stiffness and is easily deformed, it is possible to provide a light beam deflecting device wherein distortions caused by adhesion are absorbed, mirror flatness is improved, the life is long despite high speed rotation, reliability is high and scanning characteristics are excellent.

BRIEF DESCRIPTION OF THE DRAWINGS

Each of FIG. 5(A)

DETAILED DESCRIPTION OF THE PREFERRED EMBODIMENT

Embodiments of the invention will be explained as follows. Incidentally, the description in the present embodiment limits neither technical scope of the Structures (1) to (3) nor meaning of terminology. Further, the decisive explanation in the embodiment of the invention is one showing the best mode, and it does not limit the meaning of terminology and technical scope of the invention.

Figure 1:
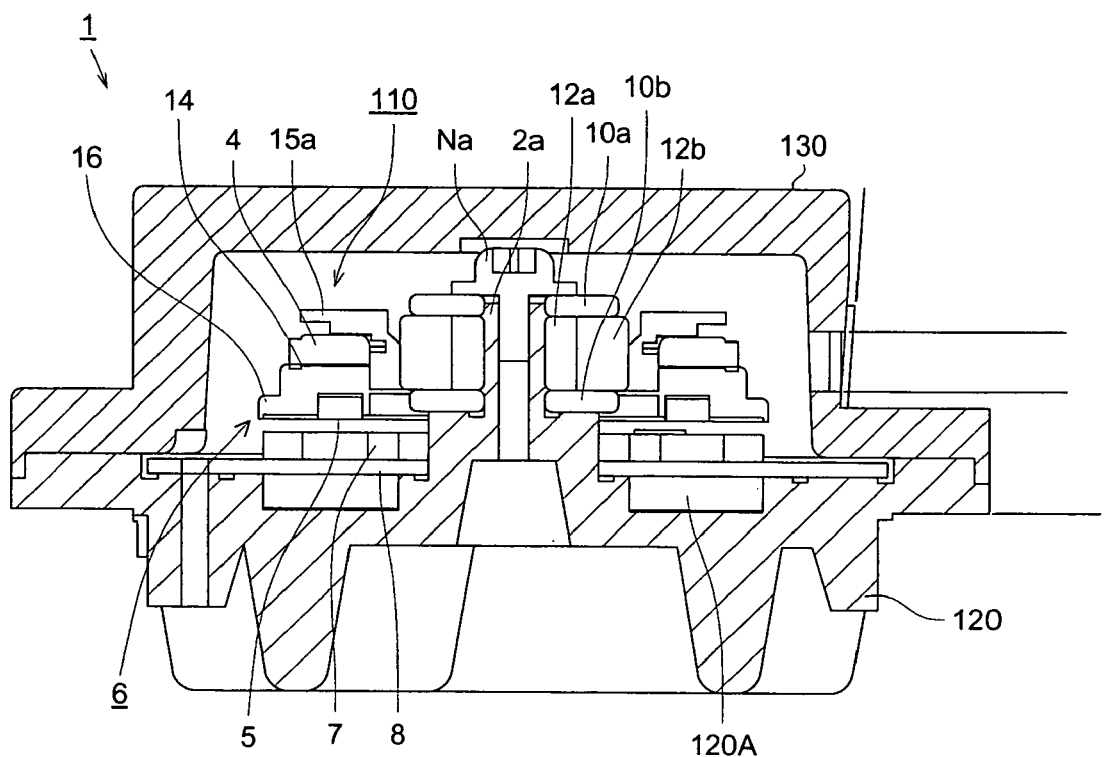
FIG. 1 is a schematic sectional view of a light beam deflecting device equipped with a polygon mirror (rotating polygon mirror) which is common to the invention.

(1) The light beam deflecting device equipped with a polygon mirror (rotating polygon mirror) which is common to the invention will be explained as follows, referring to FIG. 1. FIG. 1 is a schematic sectional view of a light beam deflecting device equipped with a polygon mirror (rotating polygon mirror) which is common to the invention.

In FIG. 1, an integrated one including a fixed bearing that is formed by upper thrust bearing 10a, lower thrust bearing 10b and inner cylindrical bearing 12a interposed between the upper thrust bearing 10a and the lower thrust bearing 10b, outer cylindrical bearing 12b serving as a bearing (movable bearing) and rotor portion 110 is mounted on shaft portion 2a of base member 120 by screw Na. The rotor portion 110 is composed of flange portion 15a and magnet yoke 6 formed by holding plate 16 and magnet 5, both interposing polygon mirror (rotating polygon mirror) 4. Flat spring 14 representing an elastic material is provided between holding plate 16 and polygon mirror 4. An elastic member such as flat spring 14 is made to lie between an end on one side of polygon mirror 4 and holding plate 16, so that holding force of holding plate 16 applied on polygon mirror 4 may be stabilized, thus, the mirror is fixed without distorting polygon mirror 4. In addition, fixed yoke 120A is provided on base member 120, and coil 7 and fixed yoke 120A are mounted to interpose printer base board 8. Motor cover 130 is fixed on the base member 120 with unillustrated screws, for example, so that the aforementioned members are integrated solidly to construct the light beam deflecting device 1.

Figure 2:
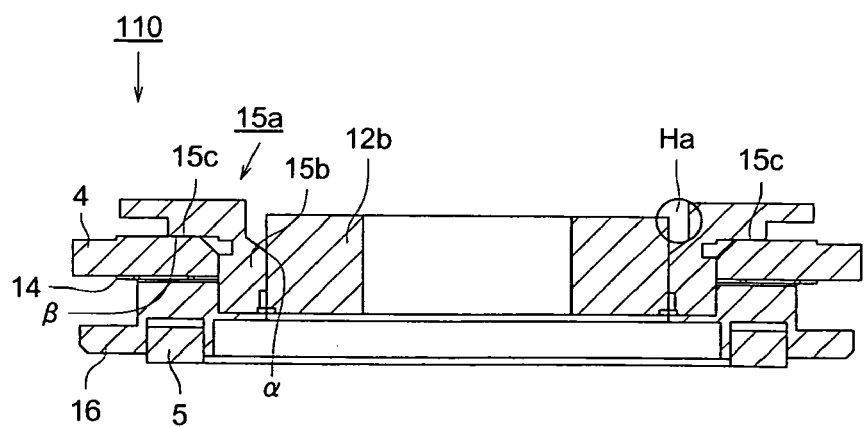
FIG. 2 is a detail drawing of a first example of a rotor portion (rotating portion) in a light beam deflecting device.
Figure 3:
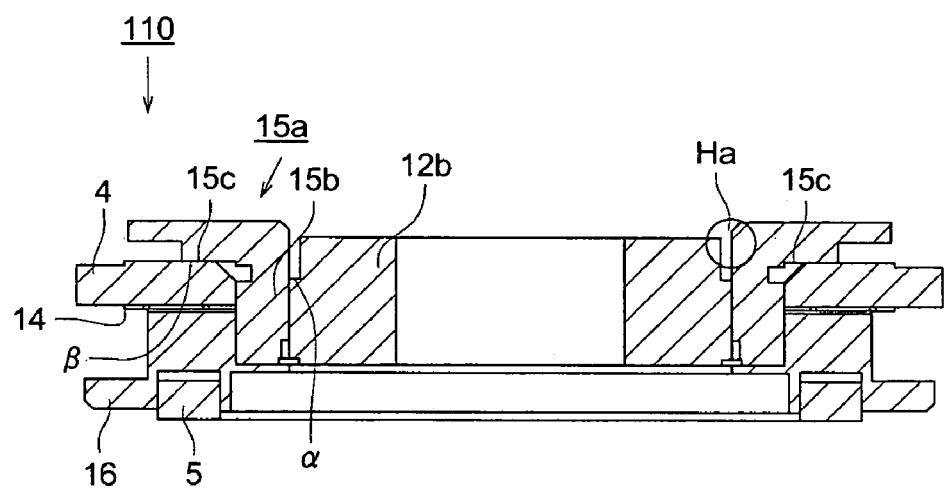
FIG. 3 is a diagram showing a variation of FIG. 2.

(2) Next, the first example of a light beam deflecting device equipped with a polygon mirror (rotating polygon mirror) wherein mirror shifting balance changes caused by thermal expansion resulting from shocks, centrifugal force and heat generation in high speed rotation are prevented, and mirror flatness is improved, will be explained as follows, referring to FIG. 2 or FIG. 3. FIG. 2 is a detail drawing of a first example of a rotor portion (rotating portion) in a light beam deflecting device, and FIG. 3 is a diagram showing a variation of FIG. 2.

The first example of rotor portion 110 of light beam deflecting device 1 is composed, as shown in FIG. 2, of flange portion 15a and holding plate 16 having magnet 5 (magnet yoke 6 explained in FIG. 1) both interposing polygon mirror (rotating polygon mirror) 4, and it is rotated solidly with outer cylindrical bearing 12b representing a bearing (movable bearing). Clearance Ha is formed between a surface where an inner part of the flange portion 15a is cut off and an outer circumferential surface on the upper portion of the outer cylindrical bearing 12b. Flat spring 14 representing an elastic material is provided between the holding plate 16 and polygon mirror 4. Polygon mirror 4 is fixed on supporting section 15c of the rotor portion 110 (a portion where adhesives are coated on flange portion 15a) with adhesives such as epoxy. Even when hard adhesives such as epoxy are used, the rotor portion 110 is deformed on the portion of clearance Ha, thereby, mirror distortion caused by adhesion can be reduced. Due to this, the flatness of the polygon mirror 4 and prevention of shifting of the polygon mirror 4 can be made compatible. It is preferable that hardness of the epoxy resin adhesives mentioned above (after curing) is 90 (in JIS K6253A corresponding to ISO 7619A). Further, it is possible to cut off an outer circumferential surface on the upper portion of the outer cylindrical bearing 12b, and to provide clearance Ha between the outer circumferential surface and an inner circumferential surface of the flange portion 15a, as shown in FIG. 3. In each of FIG. 2 and FIG. 3, supporting section bottom surface position $\beta$ is located to be higher than lowermost surface position $\alpha$ of clearance section Ha. Due to this structure, a distortion on a mirror surface can further be restrained, even when a polygon mirror is stuck and fixed on the supporting section.

The following items are included in a method for assembling rotor portion 110.

1. Outer cylindrical bearing 12b is fixed on cylinder portion 15b of rotor portion 110 by means of shrinkage fit, press fit and adhesion.

2. Supporting section 15c of the rotor portion 110 (a portion where adhesives are coated on flange portion 15a) is subjected to cutting operations so that it may become a flat surface that is perpendicular to an outer circumferential surface of outer cylindrical bearing 12b. After this, the surface of the supporting section 15c may also be roughened through blasting.

3. Adhesives such as epoxy are coated on the supporting section 15c of the rotor portion 110.

4. Polygon mirror 4 and flat spring 14 are inserted, and holding plate 16 (magnet yoke 6 explained in FIG. 1) on which magnet 5 is stuck is fixed on cylinder portion 15b of rotor portion 110 by means, for example, of a screw (not shown).

Figure 4:
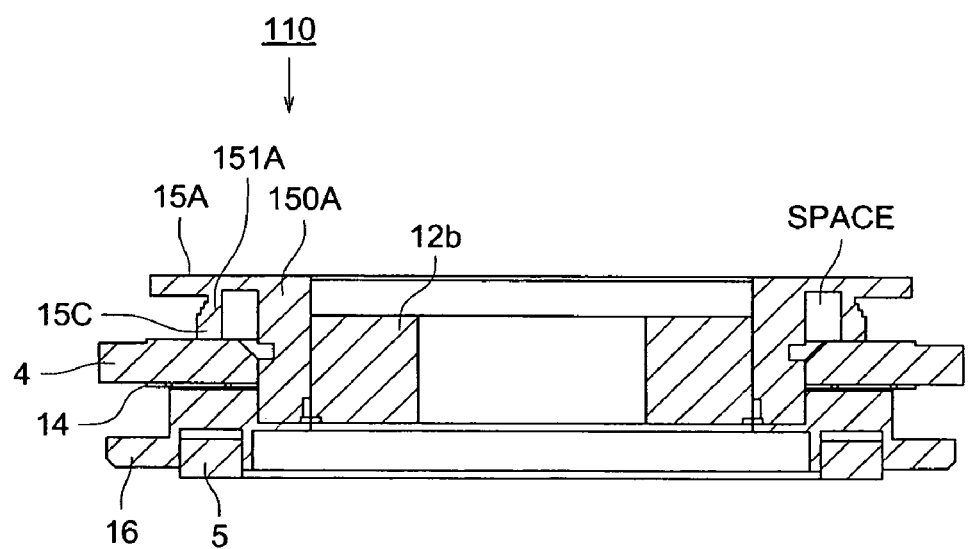
FIG. 4 is a detail drawing of a second example of a rotor portion (rotating portion) in a light beam deflecting device.

(3) The second example of a light beam deflecting device equipped with a polygon mirror (rotating polygon mirror) wherein mirror shifting balance changes caused by thermal expansion resulting from shocks, centrifugal force and heat generation in high speed rotation are prevented, and mirror flatness is improved, will be explained as follows, referring to FIG. 4. FIG. 4 is a detail drawing of a second example of a rotor portion (rotating portion) in a light beam deflecting device.

The second example of rotor portion 110 of light beam deflecting device 1 is composed, as shown in FIG. 4, of a member made up of flange portion 15A that connects the first cylinder portion 150A and the second cylinder portion 151A and of holding plate 16 (magnet yoke 6 explained in FIG. 1) having thereon magnet 5, and it is rotated solidly with outer cylindrical bearing 12b representing a bearing (movable bearing). Flat spring 14 representing an elastic material is provided between the holding plate 16 and polygon mirror 4. Polygon mirror 4 is fixed on supporting section 15c of the second cylinder portion 151A of the rotor portion 110 with adhesives such as epoxy. Even when hard adhesives such as epoxy are used, a space between the first cylinder portion 150A and the second cylinder portion 151A is deformed, thereby, mirror distortion caused by adhesion can be reduced. Due to this, the excellent flatness of the polygon mirror 4 and prevention of shifting of the polygon mirror 4 can be made compatible.

Incidentally, in the method stated above, the establishment is made so that a distance between an outer side of the first cylinder portion 150A and an inner side of the second cylinder portion 151A on the narrowest part of the recessed portion may be smaller than a depth from the deepest bottom of the recessed portion formed by the first cylinder portion 150A, the second cylinder portion 151A and the flange portion 15A to the supporting section 15c of the second cylinder portion 151A.

As an assembling method for the rotor portion 110, a method identical to that explained in FIG. 2 is used.

Figure 5A:
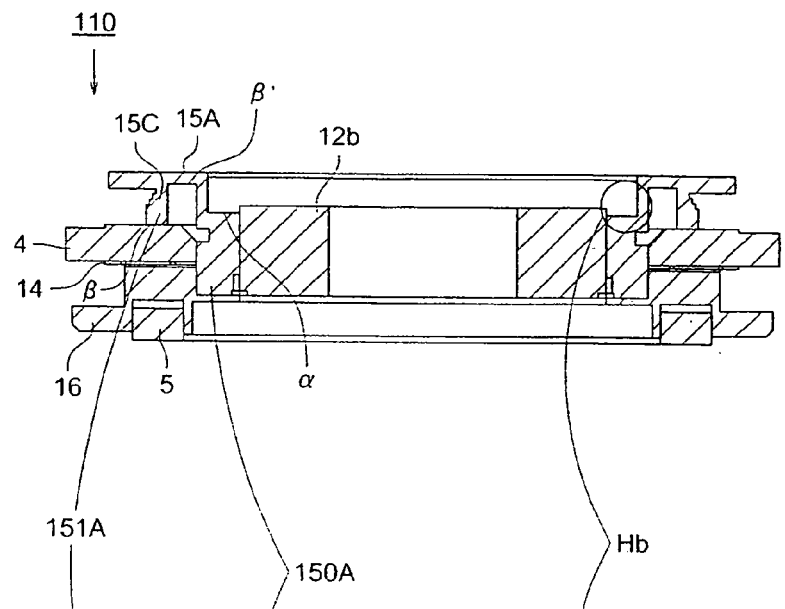
FIG. 5(B) is detail drawings of a third example of a rotor portion (rotating portion) in a light beam deflecting device.
Figure 5B:
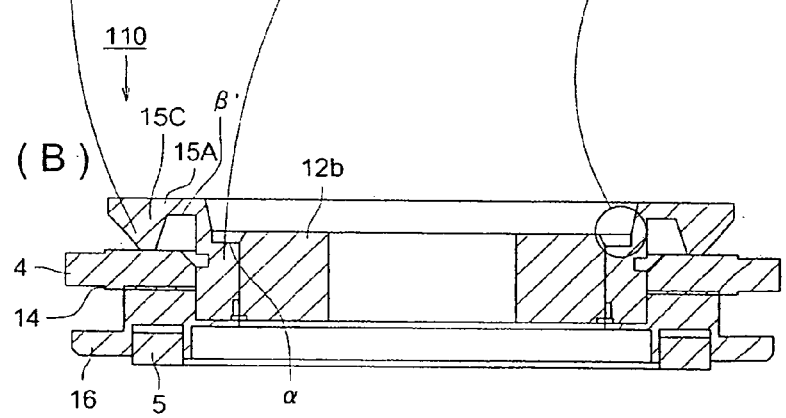
Figure 6:
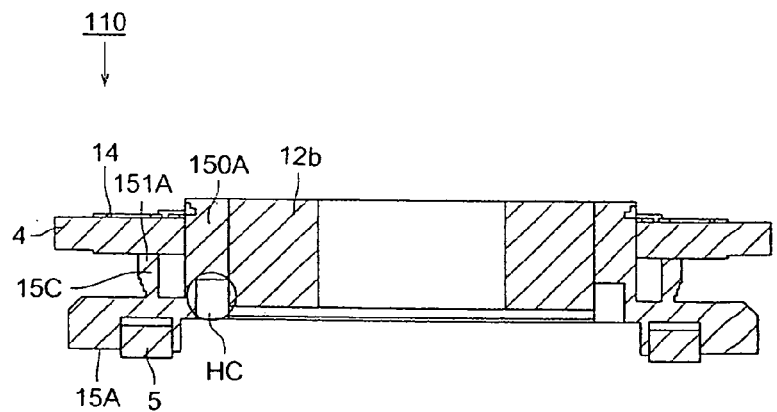
FIG. 6 is a diagram showing a variation of each of FIG. 5(A) and FIG. 5(B).
Figure 7:
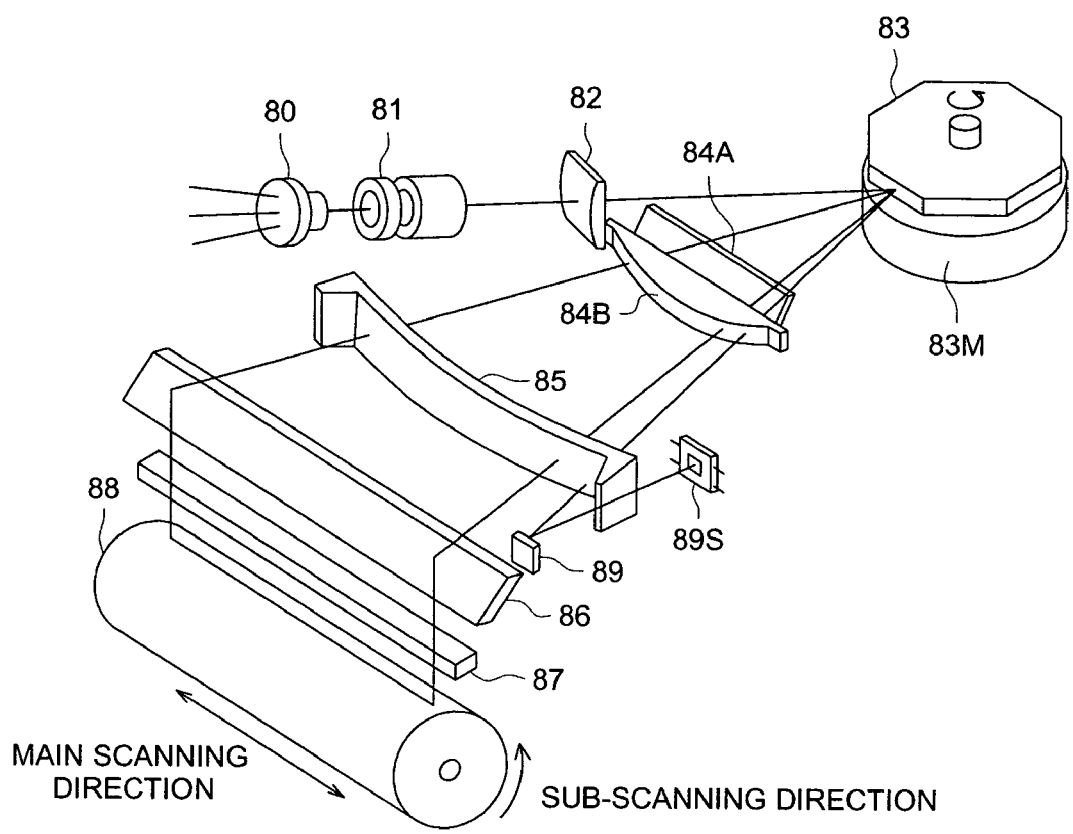
FIG. 7 is a perspective view showing an embodiment of a beam-scanning optical device employing a light beam deflecting device of a polygon mirror.

(4) The third example of a light beam deflecting device equipped with a polygon mirror (rotating polygon mirror) wherein mirror shifting balance changes caused by thermal expansion resulting from shocks, centrifugal force and heat generation in high speed rotation are prevented, and mirror flatness is improved, will be explained as follows, referring to FIGS. 5(A) and 5(B) or FIG. 6. FIGS. 5(A) and 5(B) are detail drawings of a third example of a rotor portion (rotating portion) in a light beam deflecting device, and FIG. 6 is a diagram showing a variation in FIGS. 5(A) and 5(B).

The third example of rotor portion 110 of light beam deflecting device 1 is composed, as shown in FIG. 5(A), of a member made up of flange portion 15A that connects the first cylinder portion 150A and the second cylinder portion 151A and of holding plate 16 (magnet yoke 6 explained in FIG. 1) having thereon magnet 5, and it is rotated solidly with outer cylindrical bearing 12b representing a bearing (movable bearing). Clearance Hb is formed between a surface where an inner part on the upper portion of the flange portion 15A is cut off and an outer circumferential surface on the upper portion of the outer cylindrical bearing 12b. Flat spring 14 representing an elastic material is provided between the holding plate 16 and polygon mirror 4. Polygon mirror 4 is fixed on supporting section 15C of the second cylinder portion 151A of the rotor portion 110 with adhesives such as epoxy. Even when hard adhesives such as epoxy are used, the clearance Hb is deformed, thereby, mirror distortion caused by-adhesion can be reduced. Due to this, the excellent flatness of the polygon mirror 4 and prevention of shifting of the polygon mirror 4 can be made compatible.

As an assembling method for the rotor portion 110, a method identical to that explained in FIG. 2 is used.

Incidentally, in the method stated above, the establishment is made so that a distance between an outer side of the first cylinder portion 150A and an inner side of the second cylinder portion 151A on the narrowest part of the recessed portion may be smaller than a depth from the deepest bottom of the recessed portion formed by the first cylinder portion 150A, the second cylinder portion 151A and the flange portion 15A to the supporting section 15c of the second cylinder portion 151A.

As shown in FIG. 5(B), supporting section 15C representing an adhesion surface where polygon mirror 4 is stuck to second cylinder portion 151A may also be formed to be in a form of a trapezoid. In each of FIG. 5($a$) and FIG. 5($b$), lowermost surface position a of clearance section Hb is located to be lower than the deepest surface position $\beta'$ of a recessed portion formed by the first and second cylindrical portions and by a flange portion. Due to this structure, a distortion on a mirror surface can further be restrained, even when a polygon mirror is stuck and fixed firmly on the supporting section.

FIG. 6 shows an example wherein the flange portion 15A is arranged below the light beam deflecting device, and the flat spring 14 is arranged above the light beam deflecting device, and in the same way as in the explanation in FIG. 5(A), rotor portion 110 is composed of a member made up of flange portion 15A that connects the first cylinder portion 150A and the second cylinder portion 151A and of flat spring 14, and it is rotated together with outer cylindrical bearing 12b representing a bearing (movable bearing). Clearance Hc is formed between a surface where an inner part on the lower portion of the flange portion 15A is cut off and an outer circumferential surface on the upper portion of the outer cylindrical bearing 12b. Polygon mirror 4 is fixed on supporting section 15C of the second cylinder portion 151A of the rotor portion 110 with adhesives such as epoxy. Even when hard adhesives such as epoxy are used, the clearance Hc is deformed, thereby, mirror distortion caused by adhesion can be reduced. Due to this, the excellent flatness of the polygon mirror 4 and prevention of shifting of the polygon mirror 4 can be made compatible.

Incidentally, the establishment is made so that a distance between the first cylinder portion 150A and the second cylinder portion 151A on the narrowest part of the recessed portion may be smaller than a depth from the deepest bottom of the recessed portion formed by the first cylinder portion 150A, the second cylinder portion 151A and the flange portion 15A to the supporting section 15c of the second cylinder portion 151A.

As an assembly method for the rotor portion 110, a method identical to that explained in FIG. 2 is used.

By employing the structures as in the invention, as stated above, it is possible to obtain a light beam deflecting device equipped with a polygon mirror (rotating polygon mirror) wherein shifting balance changes caused by thermal expansion resulting from shocks, centrifugal force and heat generation in high speed rotation are prevented, and mirror flatness is improved.

What is claimed is:

1. A light bean deflecting device comprising:
    (a) a rotor portion fixed on an outer circumference of a bearing;
    (b) a polygon mirror stuck and fixed on a supporting section of the rotor portion; and
    (c) an elastic material pressing against a first surface of the polygon mirror to hold the polygon mirror on the supporting section,
    wherein the rotor portion has a cylinder portion fixed on the outer circumference of the bearing, the supporting section and a disc-shaped flange portion being provided on an end portion of the cylinder portion, and wherein a clearance is provided between an inner circumference of the cylinder portion on an end portion side where the flange portion is provided and an outer circumference of the bearing, and
    wherein a bottom surface position of the supporting section is located further from the first surface of the polygon mirror than a lowermost surface position of the clearance in an axial direction of the bearing.

2. The light beam deflecting device of claim 1, wherein an epoxy resin adhesive is used for sticking and fixing.

3. The light beam deflecting device of claim 1, wherein hardness of the adhesive used for sticking and fixing is 90 in Young's modulus.

4. The light beam deflecting device of claim 1, wherein the supporting section is formed in a form of a trapezoid.

5. The light beam deflecting device of claim 1, wherein a surface of the supporting section to which the polygon mirror is mounted is roughened.

6. A light beam deflecting device comprising:
    (a) a rotor portion fixed on an outer circumference of a bearing;
    (b) a polygon mirror stuck and fixed on a supporting section of the rotor portion; and
    (c) an elastic material for pressing and holding the polygon mirror on the supporting section,
    wherein the rotor portion has a first cylinder portion fixed on the outer circumference of the bearing, a second cylinder portion on which the supporting section is provided and a flange portion that connects the first cylinder portion to the second cylinder portion, and
    wherein the first cylinder portion, the second cylinder portion and the flange portion form a recessed portion having a radial section provided with three lines and two corners which are formed by adjoining lines from among said three lines.

7. The light beam deflecting device of claim 6, wherein a distance between an outer side of the first cylinder portion and an inner side of the second cylinder portion on a narrowest part of the recessed portion in a radial direction of the bearing is smaller than a depth in an axial direction of the bearing from a deepest bottom of the recessed portion to the supporting section of the second cylinder portion.

8. The light beam deflecting device of claim 6, wherein an epoxy resin adhesive is used for sticking and fixing.

9. The light beam deflecting device of claim 6, wherein hardness of the adhesive used for sticking and fixing is 90 in Young's modulus.

10. The light beam deflecting device of claim 6, wherein the supporting section is formed in a form of a trapezoid.

11. The light beam deflecting device of claim 6, wherein a surface of the supporting section to which the polygon mirror is mounted is roughened.

12. A light beam deflecting device comprising:
    (a) a rotor portion fixed on an outer circumference of a bearing;
    (b) a polygon mirror stuck and fixed on a supporting section of the rotor portion; and
    (c) an elastic material pressing against a first surface of the polygon mirror to hold the polygon mirror on the supporting section,
    wherein the rotor portion has a first cylinder portion fixed on the outlet circumference of the bearing, a second cylinder portion on which the supporting section is provided and a flange portion that connects an end portion of the first cylinder portion to the second cylinder portion, and wherein a clearance is provided between an inner circumference of the first cylinder portion on the end portion side where the flange portion is provided and an outer circumference of the bearing, and
    wherein the first cylinder portion, the second cylinder portion and the flange portion form a recessed portion, with a position of a deepest bottom of the recessed portion in an axial direction of the bearing is located further from the first surface of the polygon mirror than that of a deepest bottom of the clearance in an axial direction of the bearing.

13. The light beam deflecting device of claim 12, wherein a distance between an outer side of the first cylinder portion and an inner side of the second cylinder portion on a narrowest part of the recessed portion in a radial direction of the bearing is smaller than a depth in the axial direction of the bearing from a deepest bottom of the recessed portion to the supporting section of the second cylinder portion.

14. The light beam deflecting device of claim 12, wherein an epoxy resin adhesive is used for sticking and fixing.

15. The light beam deflecting device of claim 12, wherein hardness of the adhesive used for sticking and fixing is 90 in Young's modulus.

16. The light beam deflecting device of claim 12, wherein the supporting section is formed in a form of a trapezoid.

17. The light beam deflecting device of claim 12, wherein a surface of the supporting section to which the polygon mirror is mounted is roughened.

* * * * *